1

3,000,968
METHOD OF PREPARING NITRO COMPOUNDS
Karl Klager, Monrovia, Calif., assignor to Aerojet-General Corporation, Azusa, Calif., a corporation of Ohio
No Drawing. Filed Mar. 5, 1956, Ser. No. 570,204
13 Claims. (Cl. 260—644)

This invention relates to new high explosive compositions of matter and to a method of preparing them. This invention also relates to a new process for introducing nitroalkyl groups into organic compounds.

This application is a continuation-in-part of my copending application Serial No. 337,212, filed February 16, 1952, now abandoned.

The new compositions of matter of this invention are trinitroalkane compositions, having the general formula:

$$\text{R}-\underset{\underset{\text{NO}_2}{|}}{\overset{\overset{\text{NO}_2}{|}}{\text{C}}}-\text{CH}_2-\underset{\underset{\text{NO}_2}{|}}{\text{CH}}-\text{R}''$$

wherein R and R'' are hydrogen or lower alkyl radicals.

The new process of this invention is useful in preparing the compounds having the general formula:

$$\text{R}-\underset{\underset{\text{R}'}{|}}{\overset{\overset{\text{NO}_2}{|}}{\text{C}}}-\text{CH}_2-\underset{\underset{\text{NO}_2}{|}}{\text{CH}}-\text{R}''$$

wherein R is a nitro, halogen, hydrogen or lower alkyl radical and R' and R'' are hydrogen or lower alkyl radicals.

This process can be used to prepare the new compounds of this invention, as well as a variety of other known compounds having different utilities and properties. The conventional method for introducing nitroalkyl groups into organic compounds has been to react the compound with a nitro-olefin. This process generally leads to relatively poor yields due to the tendency of nitro-olefins to polymerize, thereby preventing the occurrence of the reaction and at the same time rendering separation of the desired product, if any, difficult.

The new process of this invention permits the introduction of nitroalkyl groups into organic compounds without employing any nitro-olefin. The reaction proceeds smoothly and produces the desired product in high yield. The new process of this invention proceeds according to the general reaction scheme set forth below:

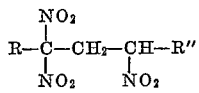

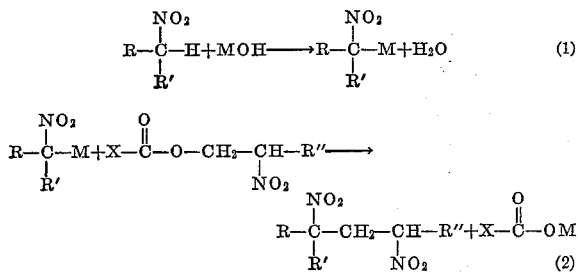

wherein R is a nitro, halogen, hydrogen or lower alkyl radical, R' is a hydrogen or lower alkyl radical, R'' is a hydrogen or lower alkyl radical, X is a lower alkyl, phenyl or lower arylalkyl radical, such as benzyl, and M is a monovalent radical of an alkali or alkaline earth metal. The reaction is preferably conducted at a temperature of about 40° C., however, the reaction temperature can be varied over an extremely wide range of temperatures if desired. Methanol is the preferred solvent, however, any inert organic solvent can be used if desired. While any of the alkali or alkaline earth metal hydroxides can be used in the preparation of the aci-salt, it is preferred to use sodium hydroxide for reasons of economy, and because the sodium aci-salts are generally more soluble than other alkali and alkaline earth metal salts. The lithium salts are about as soluble as the sodium salts, however, the relatively high cost of lithium hydroxide makes it more economical to use sodium hydroxide in the practice of this invention.

X, the acid portion of the ester reactant in the general reaction scheme set forth above, can be any organic radical including phenyl, alkyl, benzyl, etc., since the acid portion of the ester does not enter into the reaction. For reasons of economy, X is preferably a methyl radical.

The alkali or alkaline earth metal aci-salt can be prepared in situ in the presence of the ester reactant or can be prepared separately in advance.

The following examples are presented to more clearly define my invention. It should be understood, however, that the examples are presented purely for purposes of illustration and that the invention is to be limited only by the scope of the appended claims.

EXAMPLE I

*Preparation of 1,3,3-trinitrobutane*

A solution of 120 g. of 2,2-dinitroethane was placed in 1000 ml. of 4% aqueous sodium hydroxide and the mixture heated to 40° C. With constant stirring, 133 g. of nitroethyl acetate in 150 ml. of methanol was added slowly over a period of 30 minutes. After additional stirring for two hours at 40–45° C., two phases were observed to form. The mixture was then diluted with 2000 ml. methylene chloride and twice washed with water. The solvent was then removed by evaporation and the residue distilled at a pressure of 10 microns. The product boiled between 102 and 102.5° C. The yield of 1,3,3-trinitrobutane was 87 g.

The calculated composition for the empirical formula is: $C_4H_3N_3O_6$: Percent C, 24.88; percent H, 3.65; percent N, 21.76.

The ultimate analysis of the above compound showed: percent C, 25.27; percent H, 3.74; percent N, 21.65.

The index of refraction at 25° was 1.4760.

EXAMPLE II

*Preparation of 1,3-dinitro-3-chlorobutane*

This compound was prepared by placing in a three-necked flask, having a stirrer, dropping funnel and a reflux condenser, 750 ml. of water containing 44 g. of sodium hydroxide and cooling the solution to between 10 and 15° C. 110 g. of 1-chloro-1-nitroethane was added slowly to form the sodium salt thereof. The mixture was heated to between 30–35° C. and to the solution was added slowly 133 g. of nitroethyl acetate. The temperature was raised to 40–45° C. and was maintained at that point for one hour. At this stage, two phases were seen to form.

2500 ml. of methylene chloride was added to the mixture and the mixture washed twice with water. After drying the methylene chloride solution over sodium sulfate, the solvent was evaporated and the residue distilled at one micron at a temperature of between 80 and 90° C. in an air bath. 60 g. of 1,3-dinitro-3-chlorobutane was produced. The index of refraction for this compound $n_D^{25}$ was 1.4723.

EXAMPLE III

*Preparation of 1,3-dinitro-3-methylbutane*

44 g. of sodium hydroxide was dissolved in 750 ml. of water. To this solution, 89 g. of 2-nitropropane was added after cooling the solution to 10 to 15° C. When the aci-sodium salt formation was complete, a solution of 13.3 of nitroethyl acetate and 250 ml. of methanol was added slowly at a temperature between 40–45° C.

and the mixture stirred for three hours at 45° C. 2500 ml. methylene chloride was added to the solution and the entire mixture washed twice with water and dried over sodium sulfate and subsequently concentrated by evaporation. The residue was distilled at one micron at a temperature of 82° C. and the yield from the reaction was 78 g. of 1,3-dinitro-3-methylbutane.

The calculated percentage of nitrogen in the compound: $C_5H_{10}N_2O_4$: percent N, 17.28.

Upon analysis, the percentage of nitrogen in the compound was found to be: percent N, 17.23.

EXAMPLE IV

Preparation of 3,3,5-trinitroheptane

A three-necked flask provided with a stirrer, dropping funnel and thermometer was charged with 20 g. of sodium hydroxide, 25 ml. of water and 300 ml. of methanol. 67 g. of 1,1-dinitropropane was added and an orange colored sodium salt formed. The pH of the solution at this stage was about 7. The solution was heated to 40° C. and 80.6 g. of 2-nitrobutyl acetate was added slowly over a period of 45 minutes. The reaction mixture became dark red but there was no formation at this time of a second phase. Following a two hour period of stirring at 40–45° C., the reaction mixture was drowned in one liter of water and the resulting light green colored oil extracted with three 200 ml. portions of methylene chloride. The extracts were washed with two 300 ml. portions of water, 100 ml. of 0.1 normal sulphuric acid and dried overnight over anhydrous magnesium sulfate. The methylene chloride extracts were filtered and the solvent removed by means of a steam bath at reduced pressure which left an orange red oil. Upon distillation in small portions, the 3,3,5-trinitroheptane distilled at 108–110° C. and five microns with a yield of 25–30% of theoretical. The refractive index was $n_D^{25}$ 1.4685.

EXAMPLE V

Preparation of 1,3,3-trinitrohexane

In an apparatus consisting of a three-necked reactor equipped with a stirrer, dropping funnel and condenser was placed 20 g. of sodium hydroxide dissolved in 500 ml. of water. To this solution was added 72 g. of 1,1-dintrobutane. The mixture was heated for 20 minutes at a temperature of 20–25° C. until the sodium solution of sodium salt of 1,1-dinitrobutane had a pH of about 7. To this solution was slowly added 66.5 g. of 2-nitroethyl acetate with rapid stirring over a period of 30 minutes. The color of the mixture became red and two phases were formed. The heating and stirring were continued at 45–50° C. for two more hours. The cooled reaction mixture was extracted twice with 500 ml. of methylene chloride and the methylene chloride was washed twice with water, dried over sodium sulfate and concentrated for evacuation in vacuum. The residue was distilled at a temperature of 101–102° C. at a pressure of 1.6 microns. This reaction gave a 45% theoretical yield of 1,3,3-trinitrohexane. The refractive index was $n_D^{25}$ 1.4690.

The new process of this invention can be used to prepare a wide variety of compounds simply by reacting appropriate reactants in accordance with the general reaction scheme set forth above, and more particularly, under the conditions disclosed in the foregoing examples.

For example, I have found that sodium dinitromethane reacts with 2-nitroethyl acetate to form 1,1,3-trinitropropane; sodium nitrobromomethane reacts with 2-nitropropyl acetate to form 1-bromo-1,3-dinitrobutane; sodium nitromethane reacts with 2-nitroethyl acetate to form 1,3-dinitropropane; and sodium nitroethane reacts with 2-nitropentyl acetate to form 2,3-dinitroheptane.

The novel trinitro compounds of this invention are excellent high explosives. The new process of my invention is useful in preparing these compounds as well as a number of other compounds which are well known in the art, as for example, the dinitro compounds disclosed in the examples. The compounds having fewer than three nitro groups contain less oxygen and are not useful as explosives. The nitro, dinitro and halo-nitro compounds are useful as dye intermediates. Some of these compounds are disclosed by Lambert et al. in British Patent No. 584,789, published January 23, 1947, and Bahner et al. in United States Patent No. 2,477,162, issued July 26, 1949.

The trinitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to absorb the liquid explosive in an absorbent material such as cellulose, woodpulp or sawdust. The resultant dynamite type explosive can then be packed into the warhead of the missile. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

Alternatively, the liquid high explosives of this invention can be used in liquid form in the same manner as conventional liquid explosives such as nitroglycerin for such uses as oil well fracturing and the like. Detonation can be effected with a primary explosive or blasting cap in the conventional manner.

I claim:

1. The method of preparing nitro compounds having the formula:

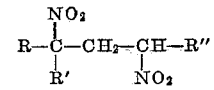

which comprises reacting an aci-salt having the formula:

with an ester having the formula:

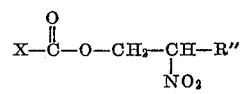

wherein R is a radical selected from the group consisting of nitro, halogen, hydrogen and lower alkyl radicals; R' is a radical selected from the group consisting of hydrogen and lower alkyl radicals; R" is a radical selected from the group consisting of hydrogen and lower alkyl radicals; M is a metal selected from the group consisting of the alkali and alkaline earth metals; and X is an organic radical selected from the group consisting of lower alkyl, phenyl and lower arylalkyl radicals.

2. The method of claim 1 wherein said aci-salt is generated in situ by reacting a metal hydroxide selected from the group consisting of alkali and alkaline earth metal hydroxides with a compound having the formula:

wherein R is a radical selected from the group consisting of nitro, halogen, hydrogen and lower alkyl radicals and R' is a radical selected from the group consisting of hydrogen and lower alkyl radicals.

3. The method of preparing nitro compounds having the formula:

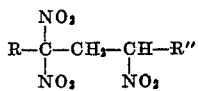

which comprises reacting a sodium aci-salt having the formula:

with an ester having the formula:

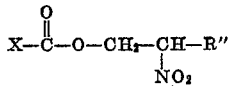

wherein R is a lower alkyl radical, R'' is a lower alkyl radical and X is an organic radical selected from the group consisting of lower alkyl, phenyl and lower arylalkyl radicals.

4. The method of preparing nitro compounds having the formula:

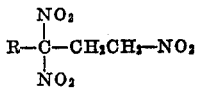

which comprises reacting a sodium aci-salt having the formula:

with an ester having the formula:

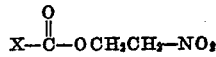

wherein R is a lower alkyl radical and X is an organic radical selected from the group consisting of lower alkyl, phenyl and lower arylalkyl radicals.

5. The method of preparing nitro compounds having the formula:

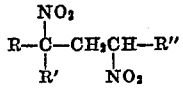

which comprises reacting an aci-salt having the formula:

with an ester having the formula:

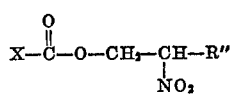

wherein R is a lower alkyl radical, R' is a halogen radical, R'' is a lower alkyl radical and X is an organic radical selected from the group consisting of lower alkyl, phenyl and lower arylalkyl radicals.

6. The method of preparing nitro compounds having the formula:

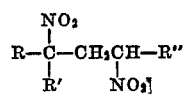

which comprises reacting a sodium aci-salt having the formula:

with an ester having the formula:

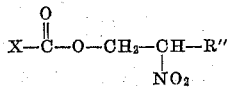

wherein R is a lower alkyl radical, R' is a lower alkyl radical, R'' is a lower alkyl radical and X is an organic radical selected from the group consisting of lower alkyl, phenyl and lower arylalkyl radicals.

7. The method of preparing nitro compounds having the formula:

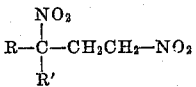

which comprises reacting a sodium aci-salt having the formula:

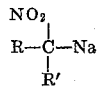

with an ester having the formula:

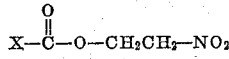

wherein R is a lower alkyl radical, R' is a halogen radical and X is an organic radical selected from the group consisting of lower alkyl, phenyl and lower arylalkyl radicals.

8. The method of preparing nitro compounds having the formula:

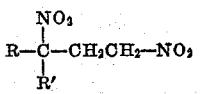

which comprises reacting a sodium aci-salt having the formula:

with an ester having the formula:

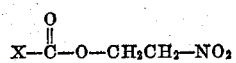

wherein R is a lower alkyl radical, R' is a lower alkyl radical and X is an organic radical selected from the group consisting of lower alkyl, phenyl and lower arylalkyl radicals.

9. The method of preparing 1,3,3-trinitrobutane which comprises reacting the sodium salt of dinitroethane with nitroethyl acetate.

10. The method of preparing 3,3,5-trinitroheptane which comprises reacting the sodium salt of 1,1-dinitropropane with 2-nitrobutyl acetate.

11. The method of preparing 1,3,3-trinitrohexane which comprises reacting the sodium salt of 1,1-dinitrobutane with 2-nitroethyl acetate.

12. The method of preparing 1,3-dinitro-3-chlorobutane which comprises reacting the sodium salt of 1-chloro-1-nitroethane with 2-nitroethyl acetate.

13. The method of preparing 1,3-dinitro-3-methylbutane which comprises reacting the sodium salt of 2-nitropropane with 2-nitroethyl acetate.

References Cited in the file of this patent

UNITED STATES PATENTS

| | | |
|---|---|---|
| 2,425,367 | Denton et al. | Aug. 12, 1947 |
| 2,542,193 | Hannum et al. | Feb. 20, 1951 |

OTHER REFERENCES

Shechter et al.: Journal of American Chem. Soc., 73–1276, 8 (1951).

Miller et al.: J. Phys. Chem., 49–20, 1 (1945), C.A. 39:1352.